United States Patent [19]
Watanabe et al.

[11] Patent Number: 5,469,312
[45] Date of Patent: Nov. 21, 1995

[54] THIN FILM MAGNETIC HEAD DEVICE HAVING A CORE RECESS SET TO A PREDETERMINED SPACING ROSS

[75] Inventors: Takashi Watanabe; Wataru Ishikawa, both of Miyagi, Japan

[73] Assignee: Sony Corporation, Tokyo, Japan

[21] Appl. No.: 853,831

[22] Filed: Mar. 19, 1992

[30] Foreign Application Priority Data

Mar. 29, 1991 [JP] Japan .................................. 3-091553

[51] Int. Cl.⁶ ......................... G11B 5/187; G11B 5/127
[52] U.S. Cl. ................................ 360/103; 29/603
[58] Field of Search ..................... 360/103, 126; 29/603

[56] References Cited

U.S. PATENT DOCUMENTS 4,893,203  1/1990  Ezaki et al. ......................... 360/103
5,083,365  1/1992  Matsumoto ......................... 29/603

Primary Examiner—Robert S. Tupper

[57] ABSTRACT

There is disclosed a thin film magnetic head device of a structure such that a thin film magnetic head having a metal magnetic film as a magnetic core is directly formed on a slider by the thin film forming technology, thus to carry out recording onto a hard disk and reproducing therefrom. When polishing processing is implemented on an air bearing surface of the slider, the magnetic core (metal magnetic film) of the thin film magnetic head is withdrawn from the air bearing surface by a difference in polishing rate. A quantity of removal (core recess) at this time is set in a range such that the spacing loss is 0.5 to 1.5 dB. Accordingly, while the core recess varies depending upon a track recording density, it is set in this invention within a region indicated by slanting lines of FIG. 8 on the basis of a maximum value of a tracking recording density to be attained.

6 Claims, 5 Drawing Sheets

THIN FILM MAGNETIC HEAD DEVICE HAVING A CORE RECESS SET TO A PREDETERMINED SPACING ROSS

BACKGROUND OF THE INVENTION

1. Field of the Invention

This invention relates to a thin film magnetic head device for a hard disk, which is of a structure such that a thin film magnetic head is directly formed on a slider member comprised of a rigid substrate or base to carry out recording onto a hard disk and reproducing therefrom.

2. Description of the Prior Art

A magnetic head device for writing an information signal onto the so-called hard disk or reading it out therefrom is caused to be typically of the flying type in which a slider flies with a very small spacing from the disk surface in recording/reproduction. Accordingly, the slider and the magnetic head are ordinarily of an integral structure.

Heretofore, as the magnetic head device of this kind, there is known a magnetic head device of the monolithic type in which the entirety thereof including, e.g., a slider, is integrally formed by a ferrite material, and so forth, a magnetic head device of the composite type in which a magnetic head separately made up is buried into a slider, and a magnetic head device of the thin film type in which a thin film magnetic head is directly formed on a slider by the vacuum thin film formation technology.

Especially, in the magnetic head device of the thin film type, a metal magnetic film having a high saturation magnetic flux density is used as a magnetic core. Therefore, such a magnetic head device has excellent merit in that the magnetic field distribution is steep or sharp, the inductance is small, and so forth. Accordingly, under the circumstances where an improved recording density and/or a high speed transfer rate are required, it is exceedingly expected that such magnetic head devices of the thin film type are put into practice.

However, in the above-mentioned magnetic head device of the thin film type, there takes place a problem peculiar to the thin film magnetic head, which is so called a core recess, due to the fact that the slider and the magnetic core of the thin film magnetic head are greatly different from each other in material.

The above-mentioned core recess is formed after processing of an opposite surface to a hard disk (air bearing surface), and is the phenomenon that the magnetic core of the thin film magnetic head is withdrawn from the air bearing surface.

For example, in the case where the slider is comprised of a very hard material such as $Al_2O_3$—TiC, and so forth, since the magnetic core of the thin film magnetic head is comprised of a relatively soft metal magnetic film, polishing of only this metal magnetic film is selectively developed, so a magnetic gap for carrying out recording/reproduction is somewhat withdrawn from the air bearing surface.

As stated above, when a core recess takes place so that the magnetic gap is withdrawn from the air bearing surface, the spacing between the hard disk and the magnetic head becomes greater, thus making it difficult to attain a high recording density.

Various methods have been proposed as a measure for minimizing the core recess. With these methods, improvements can be made to some degree. For example, if a very fine abrasive or polishing material is used to carry out polishing for a long time, such core recess might be reduced.

However, the manufacturing cost extremely increases with reduction of a recess quantity. Therefore, this method is not so effective in practical use.

OBJECT AND SUMMARY OF THE INVENTION

An object of this invention is to provide a thin film magnetic head device for a hard disk, which is capable of attaining a high recording density, and which can be satisfactory also from a viewpoint of an economical requirement such as a manufacturing cost, and so forth.

To achieve the above-described object, a thin film magnetic head device for a hard disk according to this invention is characterized in that a thin film magnetic head having a metal magnetic film as a magnetic core is formed on a magnetic head formation surface of a slider member, and that a quantity of withdrawal of the magnetic core (hereinafter referred to as a core recess quantity) from the opposite surface to a hard disk of the slider member is set in a range such that the spacing loss is 0.5 to 1.5 dB.

If an attempt is made to reduce a core recess quantity, the manufacturing cost increases to a high degree. On the other hand, such core recess quantity results in a spacing from a viewpoint of the magnetic recording, thus affecting the electromagnetic conversion characteristic. To what degree the core recess quantity affects the electromagnetic conversion characteristic varies depending upon a recording wavelength.

In this invention, in order to allow the electromagnetic conversion characteristic and the economical requirement to be compatible, a core recess quantity corresponding with a recording density is set.

Namely, if the core recess quantity is in a range such that the spacing loss is 0.5 to 1.5 dB, it is tolerable or allowable from a viewpoint of the electromagnetic conversion characteristic.

In addition, if the core recess quantity is caused to be allowed within the above-mentioned range, restriction in production on a polishing method, and so forth is relaxed. Thus, an increase in the manufacturing cost can be as minimized as possible.

Accordingly, in accordance with this invention, it is possible to provide a thin film magnetic head for a hard disk, which is capable of attaining high recording density, and which can be satisfactory also from a viewpoint of the economical requirement such as manufacturing cost, etc.

DESCRIPTION OF THE PREFERRED EMBODIMENT

A preferred embodiment to which this invention is applied will be described in detail on the basis of actual experimental results.

Figure 1:
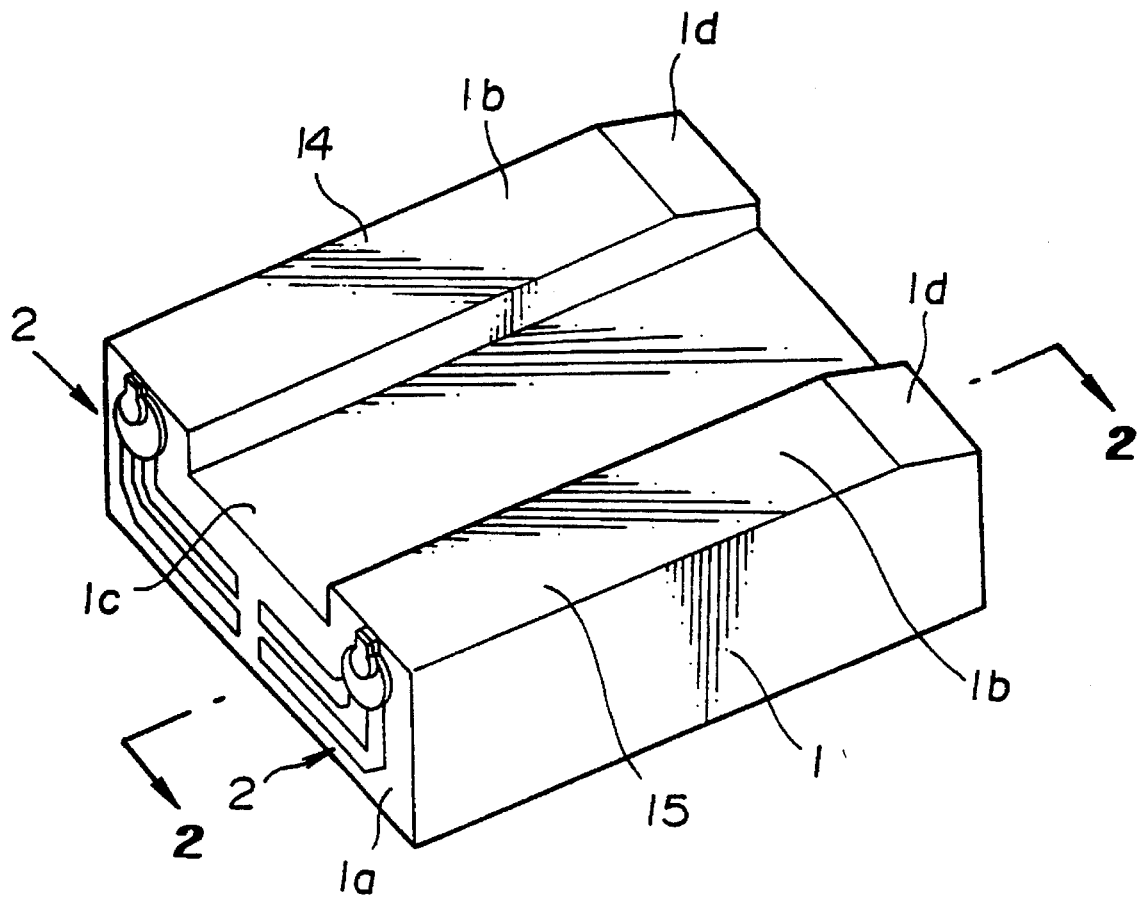
FIG. 1 is a schematic perspective view showing an example of a thin film magnetic head device according to this invention.

An example of the configuration of a thin film magnetic head device to which this invention is applied is first schematically shown in FIG. 1.

As shown in the figure, this thin film magnetic head device comprises, as the main components, a slider member 1 comprised of a non-magnetic material such as ceramics, and so forth in which groove processing is implemented on the surface opposite to a hard disk, and thin film magnetic heads 2 formed on one end surface 1a perpendicular to the opposite surface.

The above-mentioned slider member 1 is formed by a very hard ceramic material, e.g., $Al_2O_3$—TiC. At the surface opposite to a hard disk, i.e., the central portion between air bearing surfaces 1b, a recessed portion 1c along a running direction of the slider member 1c is formed as an air inflow groove.

Further, respective air bearing surfaces 1b of the slider member 1 are obliquely cut on the air inflow end side so that tapered surfaces 1d are provided. Thus, this device is adapted to receive air pressure by the tapered surfaces 1d to allow the slider member 1 to immediately fly or levitate.

Figure 2:
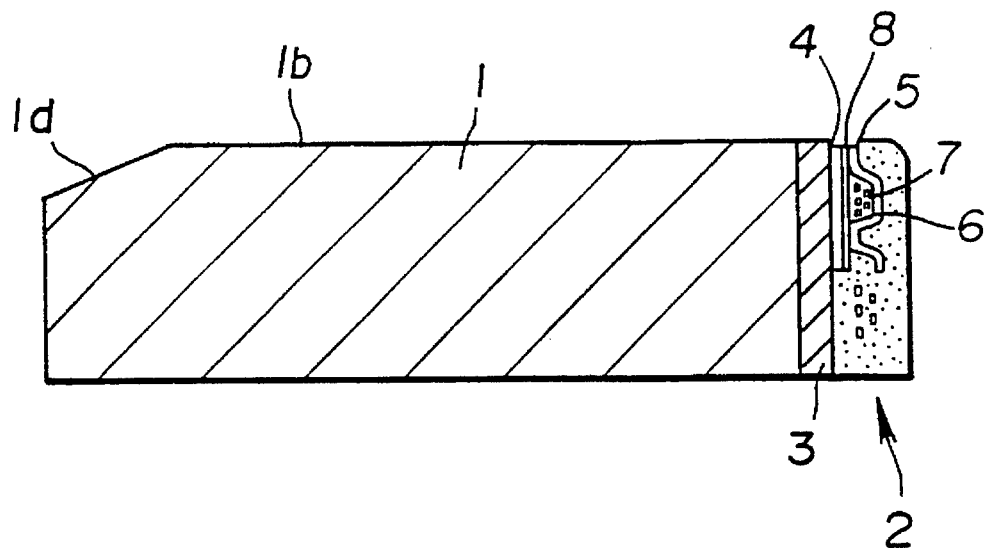
FIG. 2 is a cross sectional view taken along the line A—A of FIG. 1.
Figure 3:
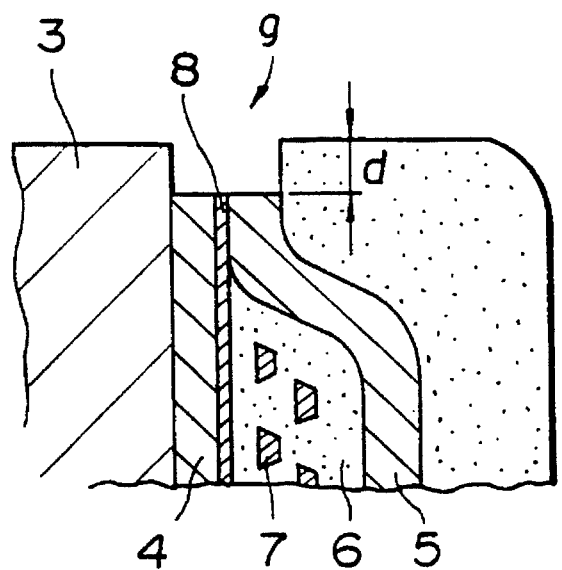
FIG. 3 is an enlarged cross sectional view in the vicinity of a magnetic gap.

On the other hand, each thin film magnetic head 2 is formed through an alumina layer 3 on one end surface 1a of the slider member 1 as shown in FIGS. 2 or 3, for example.

This thin film magnetic head 2 is of a structure, as shown in FIG. 3, in which a pair of magnetic cores are formed by a lower magnetic film 4 and an upper magnetic film 6, and a conductor coil 7 is formed by etching in a spiral form through an insulating film 6 between these magnetic films 4 and 5.

Here, the lower magnetic film 4 and the upper magnetic film 5 are opposed with a predetermined depth through a gap spacer 8 on the air bearing surface 1b side of the slider member 1 to constitute a magnetic gap g.

Further, it is ideal to employ a configuration such that the front end portions of the lower magnetic film 4 and the upper magnetic film 5 are caused to be flush with the air bearing surface 1b of the slider member 1, and that the magnetic gap g faces the air bearing surface 1b.

However, when after the thin film magnetic heads 2 are formed, a polishing processing is implemented in order to ensure surface accuracy of the air bearing surface 1b of the slider member 1, the lower magnetic film 4 and the upper magnetic film 5 constituting a magnetic core are withdrawn from the air bearing surface 1b as shown in FIG. 3.

The reason why such withdrawal takes place is that since the lower magnetic film 4 and the upper magnetic film 5 are a metal magnetic film, and have a hardness lower than that of the slider member 1 comprised of $Al_2O_3$—TiC or the alumina layer 3, and so forth development of polishing is fast.

Study on the relationship between a withdrawal quantity (core recess quantity) d from the air bearing surface 1b of the lower magnetic film 4 and the upper magnetic film 5 and a manufacturing cost has been conducted.

As one measure to reduce the core recess quantity d, there is a method of allowing free abrasive grain used for polishing to be fine.

Figure 4:
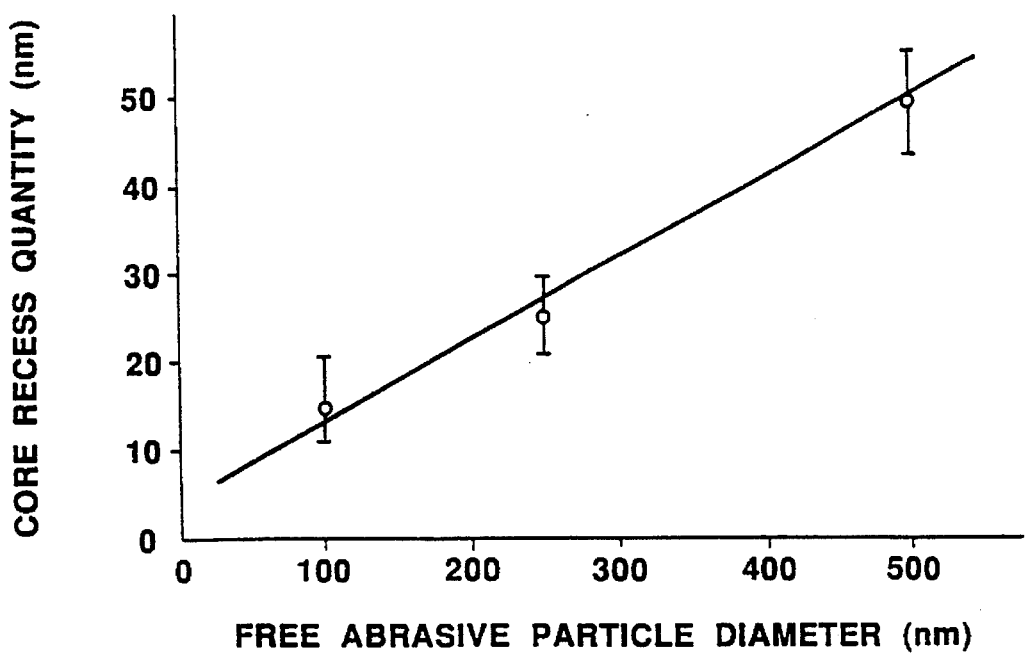
FIG. 4 is a characteristic diagram showing the relationship between a particle diameter of free abrasive grain used for polishing and a core recess quantity.

For example, as shown in FIG. 4, when an approach is employed to reduce the particle diameter of free abrasive grain used in polishing the air bearing surface 1b, and to narrow the width of the particle diameter distribution, the core recess quantity d can be reduced. At this time, it is of course needless to say that suitable pressure application, oil film thickness, and/or dispersant, and so forth are required.

Figure 5:
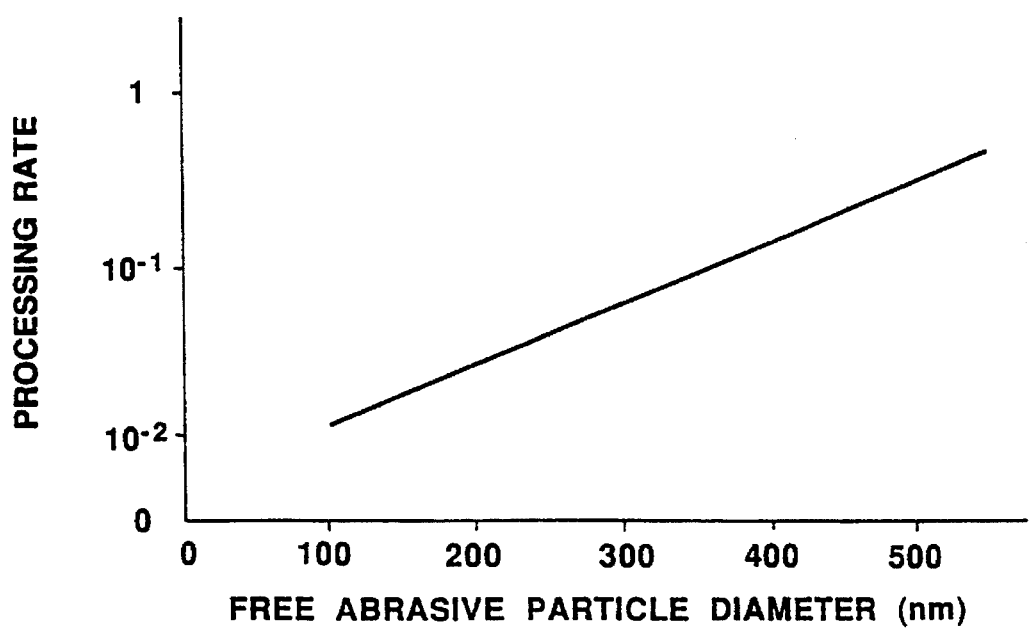
FIG. 5 is a characteristic diagram showing the relationship between a particle diameter of free abrasive grain used for polishing and a processing rate.

However, when the particle diameter of free abrasive grain used is reduced as shown in FIG. 5, the processing rate is drastically lowered, so the processing time is prolonged exceedingly. Thus, the productivity is remarkably deteriorated.

Figure 6:
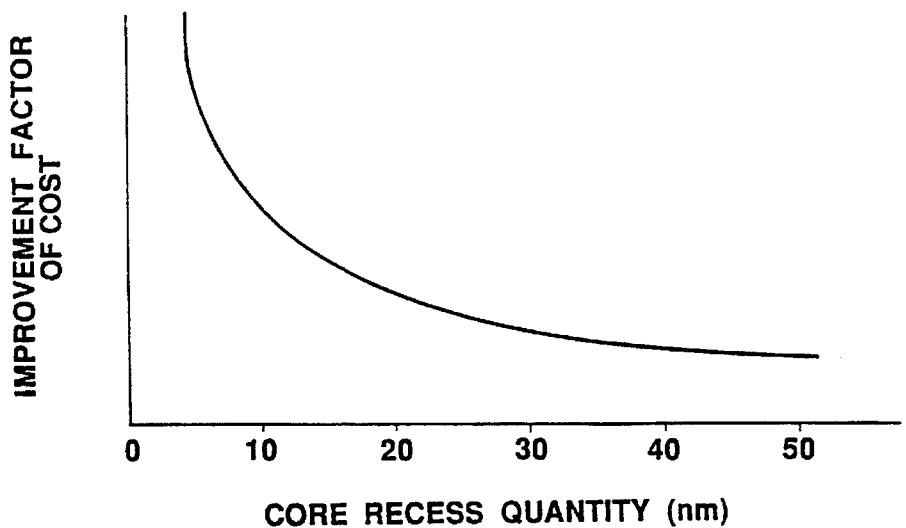
FIG. 6 is a characteristic diagram showing the relationship between a core recess quantity and an improvement factor of cost for attaining it.

Therefore, as shown in FIG. 6, as the core recess quantity becomes small, the cost required for improving a core recess quantity drastically becomes large.

On the other hand, the core recess quantity is considered as a spacing from a viewpoint of the magnetic recording, and affects the electromagnetic conversion characteristic. To what degree the core recess quantity affects the electromagnetic conversion characteristic changes in depending upon a recording wavelength. The relationship between a track recording density and a spacing sensitivity (dB/10 nm) is shown in FIG. 7.

Figure 7:
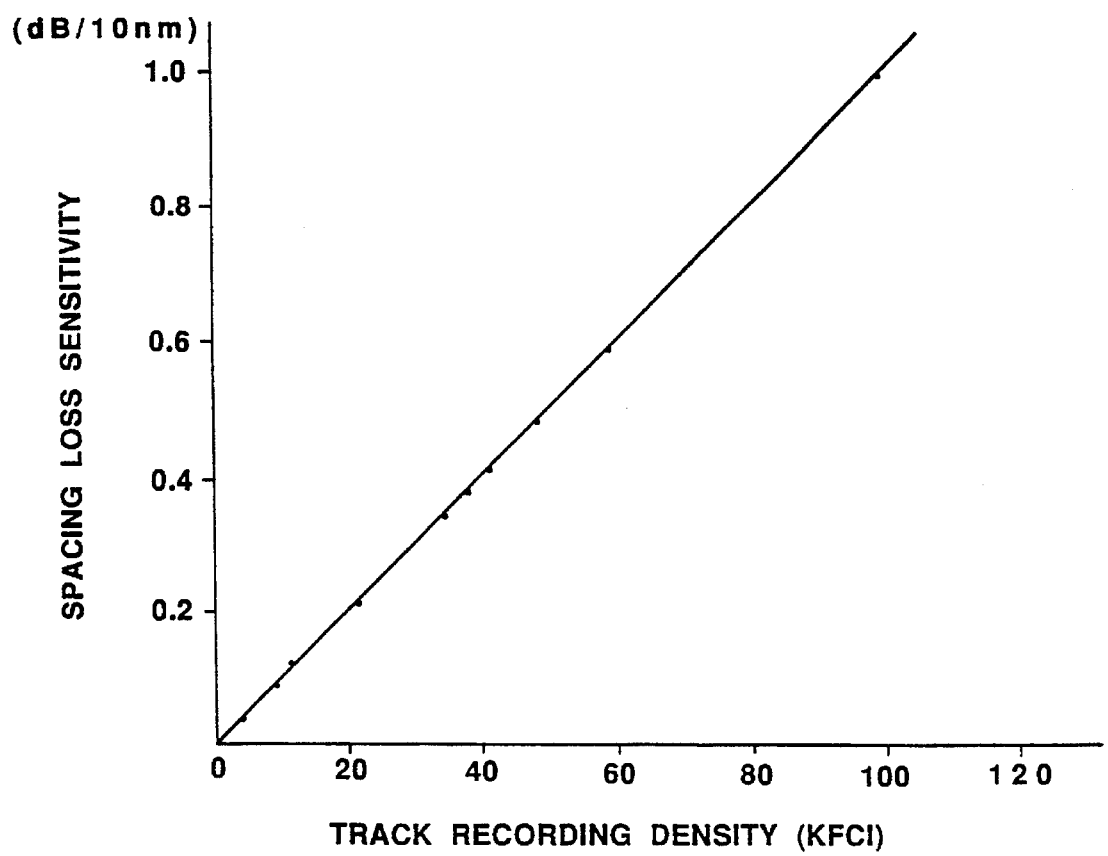
FIG. 7 is a characteristic diagram showing the relationship between a spacing sensitivity and a track recording density.

As apparent from FIG. 7, the spacing loss per 10 nm increases in proportion to the fact that the track recording density becomes large.

Figure 8:
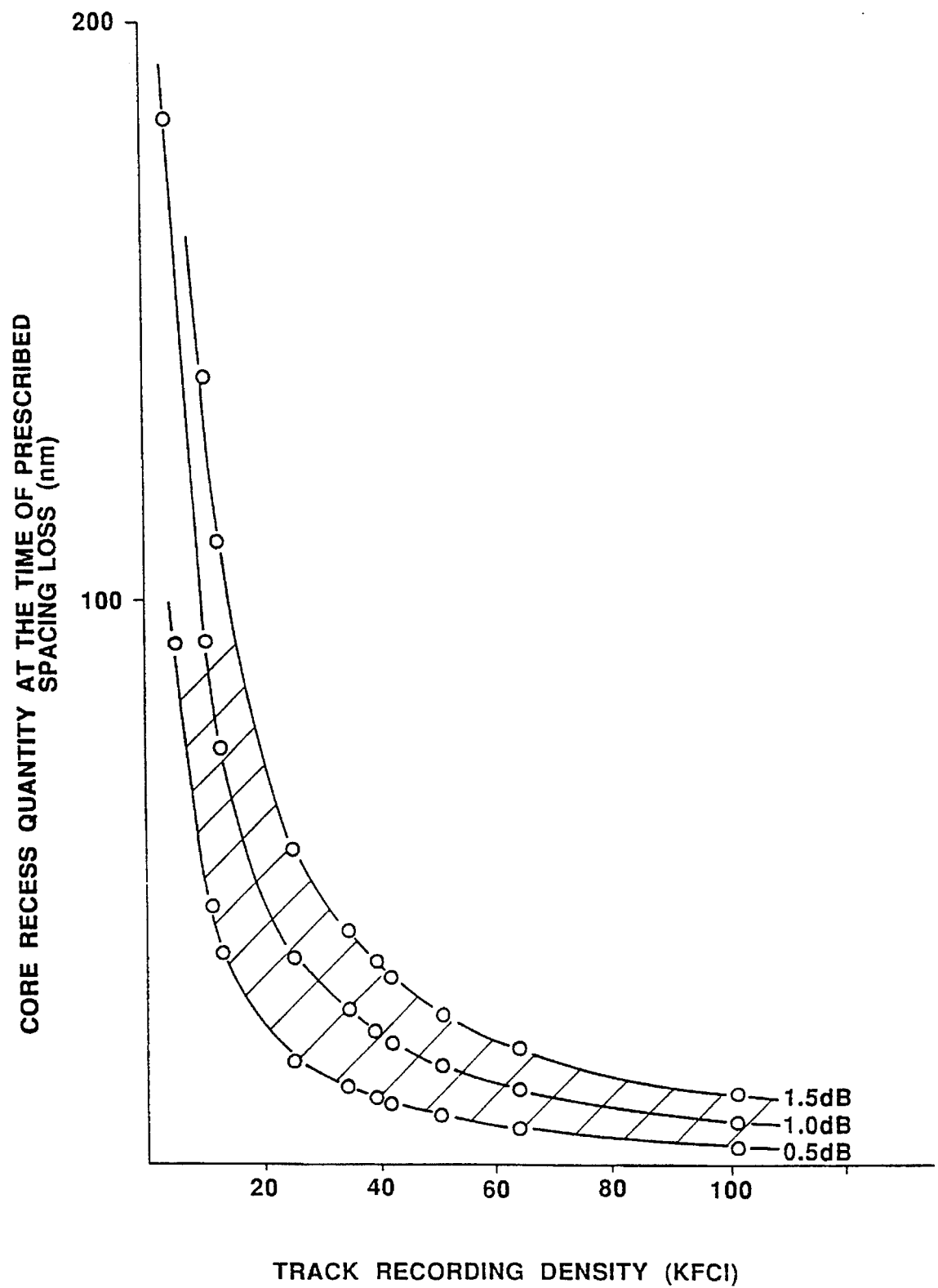
FIG. 8 is a characteristic diagram showing the relationship between a core recess quantity at the time of a predetermined spacing loss and a track recording density.

In view of this, core recess quantities when the spacing loss becomes equal to 0.5 dB, 1.0 dB and 1.5 dB are plotted versus track recording density in FIG. 8. It is seen from FIG. 8 that as the spacing loss is set to a larger value, an allowed core recess quantity becomes large.

On the basis of the above-described result of study, in this embodiment, an allowed core recess quantity is determined from a maximum value of a track recording density to be attained, thus to provide a cheap thin film magnetic head device in this range.

Namely, in FIG. 8, a core recess quantity such that the spacing loss falls within the range of 0.5 to 1.5 dB (the region encompassed by the curve where the spacing loss is 0.5 dB and the curve where the spacing loss is 1.5 dB in FIG. 8: the region indicated by slanting lines in the figure) is caused to be an allowed range. Within this range, thin film magnetic head devices are manufactured.

When the core recess quantity is caused to fall within the above-described range, the spacing loss is caused to be less than 1.5 dB at any track recording density. Therefore, there is no problem in the electromagnetic conversion characteristic.

In addition, since a core recess can be allowed to some degree from a manufacturing point of view, the manufacturing cost can fall within a practically acceptable range.

What is claimed is:

1. A thin film magnetic head device, comprising:
    a non-magnetic slider member having a first surface, including an air bearing portion, adapted to be positioned opposite to a hard disk and a substantially planar end surface extending generally perpendicular to said first surface, and having formed thereon a thin film magnetic head;

said thin film magnetic head comprising an insulating layer positioned on said end surface and, disposed on said insulating layer, a lower magnetic film, an upper magnetic film, and an insulating film between said upper and said lower magnetic films and wherein said lower magnetic film, said insulating film, and said upper magnetic film are recessed from said air bearing portion of said first surface of said slider member by a core recess quantity d, said core recess quantity being in the range determined by the area between a 0.5 dB curve and a 1.5 dB curve in a plot of core recess quantity as a function of track recording density.

2. A thin film magnetic head device as set forth in claim 1, wherein said slider member is comprised of $Al_2O_3$—TiC.

3. A magnetic head device as set forth in claim 1 wherein said slider member is formed from a hard ceramic material.

4. A magnetic head device as set forth in claim 1 wherein said slider member further includes an air inflow groove formed as a recessed surface in said first surface the remaining surfaces of said first surface acting as said air bearing portion.

5. A magnetic head device as set forth in claim 4 where said air bearing portion comprises planar surface portions adjacent to and extending from said end surface and along said first surface and obliquely angled portions adjacent to an air inflow end side of said first surface opposite said end surface.

6. A magnetic head device as set forth in claim 1 wherein said core recess is formed as a result of polishing processing of said end surface and said upper and lower magnetic surfaces and said spacer, whereupon said core recess is formed.

* * * * *